US009672649B2

(12) United States Patent
Yarosh et al.

(10) Patent No.: US 9,672,649 B2
(45) Date of Patent: Jun. 6, 2017

(54) SYSTEM AND METHOD FOR ENABLING MIRROR VIDEO CHAT USING A WEARABLE DISPLAY DEVICE

(71) Applicant: AT&T Intellectual Property I, LP, Atlanta, GA (US)

(72) Inventors: Svetlana Yarosh, Jersey City, NJ (US); Brian S. Amento, Morris Plains, NJ (US); Kevin Ansia Li, New York, NY (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 187 days.

(21) Appl. No.: 14/070,687

(22) Filed: Nov. 4, 2013

(65) Prior Publication Data

US 2015/0123991 A1    May 7, 2015

(51) Int. Cl.
| | |
|---|---|
| *G06F 3/01* | (2006.01) |
| *G06T 11/60* | (2006.01) |
| *G02B 27/01* | (2006.01) |
| *G06T 3/40* | (2006.01) |
| *G06T 3/60* | (2006.01) |
| *H04N 7/14* | (2006.01) |
| *H04N 21/414* | (2011.01) |
| *H04N 21/4223* | (2011.01) |

(Continued)

(52) U.S. Cl.
CPC .......... *G06T 11/60* (2013.01); *G02B 27/0093* (2013.01); *G02B 27/017* (2013.01); *G02B 27/0179* (2013.01); *G06F 3/017* (2013.01); *G06T 3/40* (2013.01); *G06T 3/60* (2013.01); *H04N 7/141* (2013.01); *H04N 21/41407* (2013.01); *H04N 21/4223* (2013.01); *G02B 2027/014* (2013.01); *G02B 2027/0138* (2013.01); *G02B 2027/0178* (2013.01); *G02B 2027/0181* (2013.01); *G06F 1/163* (2013.01)

(58) Field of Classification Search
CPC combination set(s) only.
See application file for complete search history.

(56) References Cited

U.S. PATENT DOCUMENTS 5,162,828 A * 11/1992 Furness et al. ............... 353/122
5,550,754 A    8/1996 McNelley et al.
(Continued)

OTHER PUBLICATIONS

DUH (Score:2) by HTH HE1 (675604) on Monday, Feb. 2, 2009©2:38PM (#26697361), http://apple.slashdot.org/story/09/02/02/1343238/apple-planning-video-cell-i phone.

*Primary Examiner* — M Good Johnson
(74) *Attorney, Agent, or Firm* — Hoffman & Baron, LLP (57) ABSTRACT

A method of exchanging audio-visual communication information between users includes detecting using an image capturing device associated with a wearable communication device, a mirror or image reflecting surface disposed in an environment of a first user, detecting a boundary of the mirror or image reflecting surface in response to the mirror being detected in the environment of the first user, selecting a portion of a first image displayed on the mirror or image reflecting surface within the boundary of the mirror or image reflecting surface, and displaying the portion of the first image as an overlay on a second image to a second user. A corresponding system and computer-readable device are also disclosed.

20 Claims, 5 Drawing Sheets

(51) Int. Cl.
*G02B 27/00* (2006.01)
*G06F 1/16* (2006.01)

(56) References Cited

U.S. PATENT DOCUMENTS

| | | | | |
|---|---|---|---|---|
| 5,689,641 A * | 11/1997 | Ludwig | ................. | G06Q 10/10 |
| | | | | 348/14.08 |
| 5,786,846 A * | 7/1998 | Hiroaki | ................. | 348/14.16 |
| 5,886,735 A | 3/1999 | Bullister | | |
| 6,088,018 A * | 7/2000 | DeLeeuw et al. | ............ | 345/156 |
| 6,211,903 B1 | 4/2001 | Bullister | ................ | H04N 7/142 |
| | | | | 348/14.01 |
| 6,774,869 B2 * | 8/2004 | Biocca et al. | ..................... | 345/8 |
| 6,842,175 B1 * | 1/2005 | Schmalstieg et al. | ........ | 345/427 |
| 7,626,569 B2 * | 12/2009 | Lanier | .................. | G06F 1/1601 |
| | | | | 345/156 |
| 7,782,401 B1 | 8/2010 | Chou | | |
| 7,865,834 B1 * | 1/2011 | van Os et al. | ................. | 715/756 |
| 7,982,762 B2 * | 7/2011 | Chatting | ................ | G06F 3/0488 |
| | | | | 348/14.07 |
| 8,068,695 B2 | 11/2011 | Dalal et al. | | |
| 8,090,157 B2 | 1/2012 | Hamza et al. | | |
| 8,203,502 B1 * | 6/2012 | Chi | ...................... | G02B 27/017 |
| | | | | 345/7 |
| 8,212,855 B2 | 7/2012 | Gupta et al. | | |
| 8,457,363 B2 | 6/2013 | Sung et al. | | |
| 8,489,887 B1 | 7/2013 | Newman et al. | | |
| 8,573,866 B2 * | 11/2013 | Bond | ..................... | G03B 17/48 |
| | | | | 348/77 |
| 8,701,020 B1 * | 4/2014 | Fulcher | ................ | G06F 3/0488 |
| | | | | 715/753 |
| 8,743,051 B1 * | 6/2014 | Moy | ....................... | G09G 5/00 |
| | | | | 345/156 |
| 8,902,315 B2 * | 12/2014 | Fisher | ................ | H04M 1/6066 |
| | | | | 348/164 |
| 9,092,053 B2 * | 7/2015 | Kerr et al. | | |
| 9,195,345 B2 * | 11/2015 | Tumanov | ................ | G06F 3/017 |
| 9,344,612 B2 * | 5/2016 | Ritchey | ................ | H04N 5/2254 |
| 2002/0061767 A1 | 5/2002 | Sladen et al. | | |
| 2002/0175990 A1 | 11/2002 | Martino et al. | | |
| 2006/0195787 A1 * | 8/2006 | Topiwala | ............. | G06Q 10/107 |
| | | | | 715/700 |
| 2008/0088696 A1 | 4/2008 | Giraldo | | |
| 2009/0153474 A1 * | 6/2009 | Quennesson | ................. | 345/157 |
| 2009/0313584 A1 * | 12/2009 | Kerr et al. | .................... | 715/849 |
| 2009/0322909 A1 * | 12/2009 | Garcia | ......................... | 348/239 |
| 2010/0085462 A1 * | 4/2010 | Sako | ................ | G02B 27/017 |
| | | | | 348/333.01 |
| 2010/0123776 A1 * | 5/2010 | Wydeven | ............... | H04N 7/183 |
| | | | | 348/77 |
| 2010/0328420 A1 | 12/2010 | Roman | | |
| 2011/0007205 A1 | 1/2011 | Lee | | |
| 2011/0155044 A1 * | 6/2011 | Burch | ..................... | G06F 3/016 |
| | | | | 116/205 |
| 2011/0214082 A1 * | 9/2011 | Osterhout et al. | ............ | 715/773 |
| 2012/0075168 A1 * | 3/2012 | Osterhout et al. | ................ | 345/8 |
| 2012/0120499 A1 * | 5/2012 | Harrison et al. | .............. | 359/631 |
| 2012/0236030 A1 * | 9/2012 | Border | ............... | G02B 27/0093 |
| | | | | 345/633 |
| 2012/0236031 A1 | 9/2012 | Haddick et al. | | |
| 2012/0242560 A1 * | 9/2012 | Nakada | ................. | G09G 3/3406 |
| | | | | 345/8 |
| 2013/0084970 A1 * | 4/2013 | Geisner | ................... | A63F 13/10 |
| | | | | 463/29 |
| 2013/0155176 A1 | 6/2013 | Paripally et al. | | |

* cited by examiner

PRIOR ART

PRIOR ART

SYSTEM AND METHOD FOR ENABLING MIRROR VIDEO CHAT USING A WEARABLE DISPLAY DEVICE

BACKGROUND

Technical Field

The present disclosure relates to a system and method for enabling a mirror video chat session in which audio-visual information is exchanged between users, and more specifically relates to a system and method for implementing a wearable computing device or similar communication device during a video chat session by detecting and using a mirror or image reflecting surface located in the user's surrounding environment so that the user's own image can be exchanged with remote participants.

Related Art

Wearable computing devices in the form of glasses or similar head-mounted face apparatus or interactive head-mounted eye-pieces are generally wearable computers with an optical head-mounted display (OHMD) with an integrated processor and an integrated image source for delivering content to an optical assembly. The user is able to view various information and images regarding the surrounding environment in smartphone-style hands-free format. These devices can also communicate via the Internet using natural language voice commands.

These wearable devices have the ability to take photos of the environment, record high-definition quality views of the surrounding environment, while simultaneously keeping the viewing screen on. The user is able to control the functions of the wearable devices using touchpad controls, which are built into the side of the device near the stem of the wearable display or similar electronic housing located otherwise in the frame portion of the device near the stem or extended away from the stem. The user controls the device by swiping the touchpad through an interactive interface displayed on the screen the user is simultaneously viewing. For example, a user can slide the touchpad in a certain direction to display current events, news, weather, while sliding the touchpad in a different direction can generate a series of past events such as photos, received phone calls, photos, and other kinds of information.

SUMMARY

Embodiments of the disclosure will become apparent from the following detailed description considered in conjunction with the accompanying drawings. It is to be understood, however, that the drawings are designed as an illustration only and not as a definition of the limits of this disclosure.

The disclosed technology is directed to a method of exchanging audio-visual communication information between users, which includes detecting an image reflecting surface disposed in an environment of a first user, detecting a boundary of the image reflecting surface in response to the image reflecting surface being detected in the environment of the first user, selecting a portion of a first image displayed on the image reflecting surface within the boundary of the image reflecting surface and displaying the portion of the first image as an overlay on a second image to a second user.

The method of exchanging audio-visual communication information may further include controlling selection of the portion of the first image in response to an image defining gesture associated with the first user. The method may include modifying a size of the portion of the first image in response to the image defining gesture associated with the first user. The method may also include displaying the portion of the first image as an overlay on the second image on the image reflecting surface disposed in an environment of the first user that can be viewed by the first user. Rotating the image capturing device may occur in response to the first user. Rotating the image capturing device may occur in response to a sensory image signal detected by the image capturing device. Generating a tactile signal to the wearable communication device associated with the first user may occur. Generating a tactile signal to the wearable communication device associated with the first user may occur in response to a sensory detection signal associated with movement by the first user towards an edge of the image reflecting surface. Generating a tactile signal to the wearable communication device associated with the first user may result in response to a sensory detection signal associated with movement by the first user outside the boundary of the image reflecting surface.

The disclosed technology is further directed to an apparatus to exchange audio-visual communication information between a first user of a wearable communication device and a second user which includes an image capturing device, a processing device, and a memory to store instructions that, when executed by the processing device, perform operations comprising detecting an image reflecting surface disposed in an environment of a first user, detecting a boundary of the image reflecting surface in response to the image reflecting surface being detected in the environment of the first user, selecting a portion of a first image displayed on the image reflecting surface within the boundary of the image reflecting surface and displaying the portion of the first image as an overlay on a second image to a second user.

The disclosed technology is yet further directed to a computer-readable device to store instructions that, when executed by a processing device, perform operations to exchange audio-visual communication information between users, wherein the operations include detecting an image reflecting surface disposed in an environment of a first user, detecting a boundary of the image reflecting surface in response to the image reflecting surface being detected in the environment of the first user, selecting a portion of a first image displayed on the image reflecting surface within the boundary of the image reflecting surface, and displaying a portion of the first image as an overlay on a second image to a second user.

The disclosed technology is yet further directed to a system and method of engaging one or more third parties in a video chat session or similar video conference session using a mirror or image reflecting surface that is detected in the environment, while also permitting the participants to view the user, as well as leverage the view provided in the mirror or image reflecting surface for chatting with same remote participants. The system and method of engaging in a mirror video chat with at least one third-party participant includes using a head-mounted display having a front-facing camera, an audio input and output, preferably microphone and speakers that are embedded in the head-mounted display, a wireless connection to a computing unit (such as a mobile phone or laptop) that can process the video and audio information captured by the front-facing camera or similar image capturing device.

The disclosed technology is yet further directed to a system and method using a processing device, such as in a wearable computer display that recognizes a user's gesturing signal. Such hand or other kind of gesturing permits the user to delineate which portion of his or her captured video image will be delivered to the third-party remote participants during the video chat session. The user may use any number of hand gestures, such as by expanding or contracting a thumb and forefinger, or moving a pointing finger upwards or downwards to capture a desired portion of the user's own video image.

The disclosed technology is yet further directed to using a mirror or image reflecting surface as a visual screen for viewing the captured video image of the user as superimposed in a coherent fashion on the third-party participant's incoming video feed. The user may view such superimposed video feeds either through the head-mounted wearable display or using the mirror or image reflecting surface in the user's environment as a viewing screen for the superimposed video image.

Embodiments will become apparent from the following detailed description, which is to be read in connection with the accompanying drawings.

BRIEF DESCRIPTION OF THE DRAWINGS

The drawings constitute a part of this disclosure and include examples, which may be implemented in various forms. It is to be understood that in some instances, various aspects of the disclosure may be shown exaggerated or enlarged to facilitate understanding. The teaching of the disclosure can be readily understood by considering the following detailed description in conjunction with the accompanying drawings.

It is to be appreciated that elements in the figures are illustrated for simplicity and clarity. Common but well-understood elements, which may be useful or necessary in a commercially feasible embodiment, are not necessarily shown in order to facilitate a less hindered view of the illustrated embodiments.

DETAILED DESCRIPTION

While wearable display devices, such as GOOGLE® glasses, are considered a great solution for displaying information in the environment, these wearable devices or eyepieces only provide the users with a front-facing camera that makes it impossible to share the wearer's own face or image during a video chat session, videoconference session or any other standard chat software sessions, such as Skype®. Thus, there is a need for a wearable display device that permits the user of the display device to project their own image to participants of the chat or video conference session. In some embodiments, the user is also permitted to view the remote participants as an overlay image on the mirror or image reflecting surface when viewing the mirror or image reflecting surface.

The disclosed system and method detects mirrors in the environment, thus allowing the participants to leverage the view provided in the mirror or image reflecting surface for chatting with remote third-party participants and for various other purposes, described in greater detail below. One of the greater concerns with portable electronic devices is that they detract from in-person social element of interacting with humans. While disclosed embodiments are not actually in-person experiences, it is believed that they permit as close to an in-person experience as possible while using a wearable display, especially in an educational or professional setting while generally avoiding the expense required to set-up other video conferencing systems.

There is also a need for various applications of the disclosed embodiments, for example in the health field. The disclosed system and method would permit a team of doctors to remotely consult about a patient's case. The front-facing camera would permit the doctor to show one or more patients' x-ray images while also stepping in front of the mirror and permitting the doctor to begin a face-to-face conference with a remote team of participants. This smooth transition between focusing on the task and speaking with the team is more natural, and closer to the aura of an in-person interaction than mere standard video chat applications.

There is a further need for an application in which the mirror chat session would allow students that are home-schooled or live in remote areas to attend a virtual classroom with a teacher. They would be able to share both their work (using the front-facing camera) while also permitting face-to-face conversations with the teacher and other students participating in the session using the disclosed embodiments.

Yet another instance is the application in a remote work setting. A company can implement inexpensive mirror or image reflecting surface to achieve the same effect as more expensive systems, such as Cisco® telepresence systems. Essentially, the conventional setup of monitors would be replaced with mirrors of the same shape and size. If each of the participants meets the standard requirements, the session can be implemented in the same fashion as the Cisco® telepresence system or similar videoconferencing systems.

Embodiments disclosed herein perform a mirror video chat session with a remote third party participant using a wearable display device including a front-facing camera and a mirror or image reflecting surface detected in the user's surrounding environment.

Figure 1:
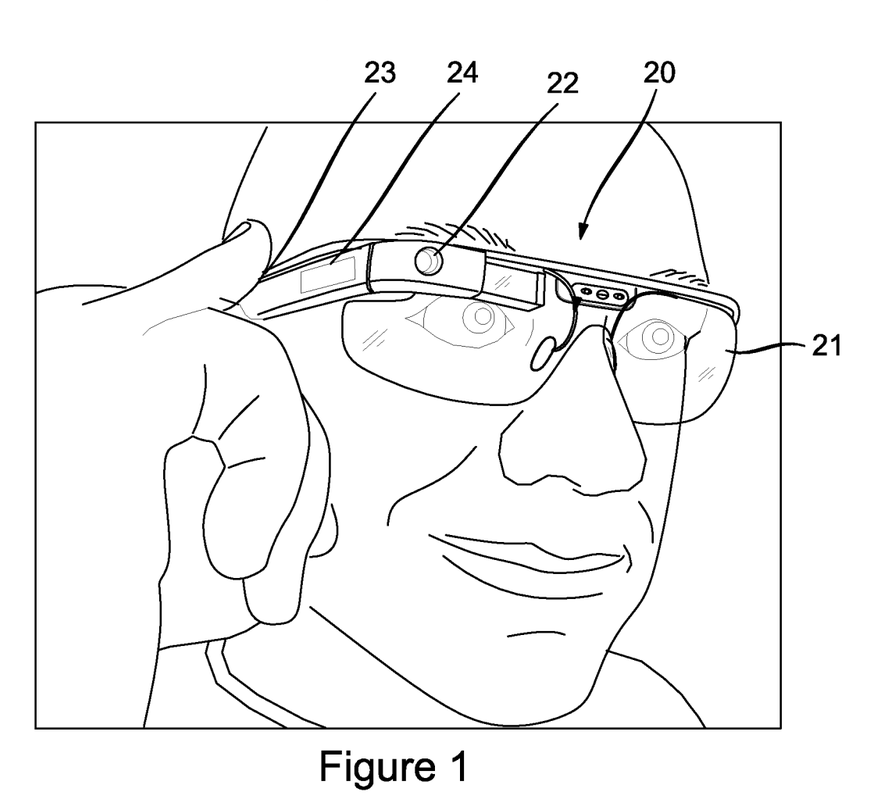
FIG. 1 is an illustration of a first embodiment of wearable display glasses.
Figure 2:
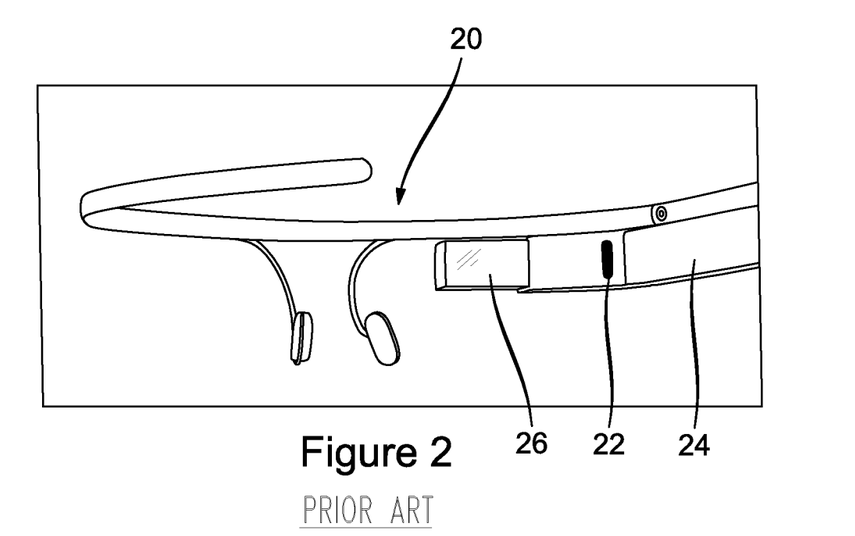
FIG. 2 is an illustration of a second embodiment of wearable display glasses.

Wearable computing devices, as shown in FIGS. 1 and 2, include devices such as GOOGLE® glasses. These head-mounted devices (20) may include lens elements (21) and (26) that may be sufficiently transparent to allow users to see through the lens elements. They may also be formed of any materials that can display a graphic image or other graphic representation. Thereby, the wearable display devices may permit an altered display where the projected image or graphic is superimposed over a real-world view as perceived by the user through the lens elements.

The wearable devices may include an on-board computing system (24) which may be positioned on the extending side-arm of the device (24), a video camera (22) or similar image capturing device, one or more sensor(s) located on the side frame portion of the device and one or more finger-operable touch pad (23) or similar interactive device. The computing system may be positioned on other parts of the head-mounted device or positioned remotely from the head-mounted device, and connected to the head-mounted device (20) wirelessly or through a wired connection. The computing device may also be configured to receive and analyze data from the video camera (22) and the finger-operable touch pad (23) and, in other embodiments, from other sensory devices, user interfaces or both, and generate images for output by the lens elements (21) or (26). The computing device may be programmed to recognize hand gesturing motions via sensors. Such hand gesturing motions are meant to delineate, by sending appropriate control signals to the computing device, which portion of the captured video image of the user is to be sent to the remote third-party participants. The video camera (22) or similar image capturing device may be configured to capture images at various resolutions and at different frame rates.

Figure 3:
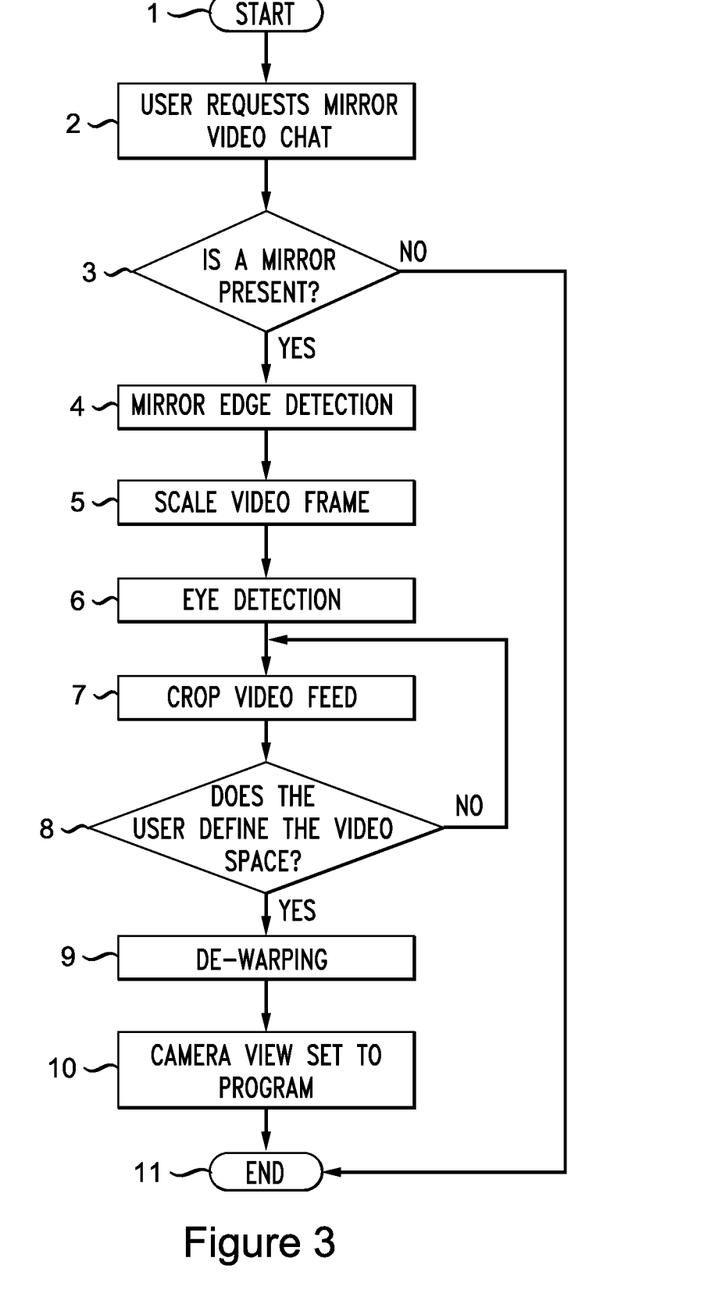
FIG. 3 is a flowchart that illustrates an example method of a mirror video chat session using a wearable display and mirror.

As shown in FIG. 3, the user initiates a mirror video chat session with a third-party while simultaneously wearing the computing device, such as GOOGLE® glasses or similar wearable display device, as shown in FIGS. 1 and 2. The wearable display that would be implemented during the mirror video chat session may include an infrared component or infrared type light, a camera or alternatively, an image capturing device and one or more processing device(s). In accordance with the embodiment shown in FIG. 3, the user initiates a mirror video chat session (2) using video chat software, such as, Skype®, Google Hangouts, or alternative chat or videoconferencing software. Since mirror video chat is a technique that essentially spoofs a camera using a mirror or image reflecting surface, it can be transparently applied to any existing video chat software. The user may initiate the mirror video chat session using controls available in the wearable device. In certain embodiments, the user may use voice control commands such as "Skype® name of person" or select a command on an operable touch pad to initiate the mirror chat session.

The third-party remote participants are not required to use the mirror chat video system unless they are also using a wearable display device with a front-facing camera. The remote participants can implement either the disclosed mirror chat system or may implement a standard video chat system, which typically includes a webcam, speakers, microphone, and network connectivity, with the remote video chat participants.

The system will next generate a control signal to detect whether a mirror or image reflecting surface of any size is present in the environment as shown in step (3). The system uses the front-facing camera in the wearable display device to scan for and detect the presence of a mirror or image reflecting surface in the user's surrounding environment. In certain embodiments, the system activates the front facing camera and asks the user to turn his or her head from side-to-side, analyzing the image feed from the camera. All objects that are reflected as images from the mirror shift positions in a way that differs from how objects in non-mirrored or non-image reflecting surfaces appear to a camera. This change in orientation of images reflected from the mirror or image reflecting surface and captured by the camera essentially allows the edges of the mirror or image reflecting surface to be identified and such detection can be implemented using a computer vision library application such as OpenCV.

The system includes an image capturing device with optical systems that will continuously capture images in the surrounding environment while simultaneously running system check(s) to detect for the gradient color and surface brightness of mirrors or image reflecting surfaces (with the exception of colored or antique mirrors) that generally match a standard gradient color and surface brightness of the mirror. The processor will determine whether the captured video image matches the template stored in the memory of the device for gradient color and surface brightness of mirrors or image reflecting surfaces.

A mirror generally has no color unless it is a mirror of a colored kind other than a standard silver mirror. An ideal mirror will reflect all light equally and spectrally. A mirror generates a spectral reflection in which all light hitting the mirror from a single direction is reflected in a single direction as it leaves the surface. Mirrors are generally made behind a layer of glass. The glass itself can sometimes absorb certain colors and so the mirror does not reflect all colors fully. In this case, it may appear that the mirror has a color.

Ideally a silver mirror, which is a generally a polished silver plated surface covering a layer of plain glass and generally reflecting whatever color is applied to its surface, would be present in the environment and can be detected by the mirror detection device. However, the image detection device can also be configured to scan for any image and/or any type of mirror (whether colored or silver).

The system will continuously scan to detect the presence of a mirror or image reflecting surface including searching for a reflection of the user if the system is programmed to search for the user's own image. The system may also scan to detect reflection of the actual mirror detection device or the housing in which it resides if programmed to detect such images as a first sub-step of actual mirror detection.

The mirror or image reflecting surface detection device or similar processing device may also be configured to detect for the image of the actual mirror detection device or the housing in which the mirror detection device resides in one embodiment. The device may be pre-programmed to detect the reflection of such image(s) from a mirror or image reflecting surface (which are stored in a memory device prior to the video chat session or prior to the mirror detection step (3)). A step of comparing currently captured images to images stored in the memory device is performed by the mirror detection device and, once a match is detected, the mirror detection device generates a control signal that indicates that a mirror or similar image reflecting surface has been detected, and the system proceeds to the mirror edge detection step (4).

The system next scans, via a mirror edge detection device or processing device, for the boundaries of the already detected mirror or image reflecting surface through the optical properties of the reflected image. A shown in step 4 of FIG. 1, once the system has generated, a signal indicating that the mirror or image reflecting surface was detected in the surrounding environment of the wearable display user, the system will next generate a signal, via the detection device, to scan for and detect the edges of the mirrors. Using the detected gradient color and surface optics of the already detected mirror, the detection unit will scan for and detect the entire surface area of the mirror until an outermost boundary perimeter of the mirror or image reflecting surface is detected, and thus delineated by the detection device as location data. The outer boundary parameters are then used by the detection device to process the image that is being reflected off the mirror.

In some embodiments, the user may also assist the detection device or processing device by motioning towards the boundary edges so that the system detects the user's manual selection of the mirror's boundaries from a visual or other sensory cue detected from the user's motion. If the mirror is a compact size mirror, the user's head motion will cue the detection device as to the boundaries of the mirror. If the mirror or image reflecting surface is a larger size, the user can motion by shifting sideways left or right from the center of the image reflecting surface towards the outer edge to direct the detection device as to the location of the outermost boundaries. There are other possible embodiments in which the detection device detects the edges of the mirror or image reflecting surface.

Once the mirror chat session is initiated and a mirror or image reflecting surface in the environment is detected, the system may request that the user select the area of the mirror or image reflecting surface to share with the third party participant. The user may use image defining gesturing to delineate and/or further define the area of the mirror the user wants to share with the third party participant.

Once a mirror is detected by the mirror detection device of the system, the system, via the front-facing camera or other image capturing device, next captures the displayed image being reflected from the mirror or image reflecting surface, which in this embodiment is the user's own image, whether a full-sized image of the user's body, a partial portion of the user's image, a portion of the facial image or the full facial image. In certain embodiments, the system may also capture multiple images reflected from the mirror or image reflecting surface that include the user's own image.

The video frame is next scaled as shown in step (5) by image processing techniques through one- or two-dimensional linear image scaling unit(s) and/or similar processes using devices for accomplishing either the magnification or reduction of the image by scaling pixel or image data including techniques that include sharpness enhancement and transient improvement in either or both of the horizontal and vertical dimensions of the image data. Some image scaling and sharpness enhancements techniques by way of example are disclosed in U.S. Pat. No. 7,782,401, which is incorporated herein by reference.

The eye detection step is next initiated as shown in step (6) of FIG. 3. The system will scan the entire image that is currently captured by the detection device or image capturing device. Generally, while the individual's own image is simultaneously viewed on the mirror or image reflecting surface, the eye detection process is commenced through processes in the art. Eye detection is accomplished using techniques such as OpenCV Haarlike eye-detection algorithm. Once the eyes are detected, the system measures the distance between the eyes as a measuring unit and will suggest an initial sharing region of 4 units wide and 5 units tall centered around the detected and measured eye area. Essentially, even without the user specifying a region to share, this permits the system to intelligently estimate which area of the mirror or image reflecting surface includes the user's face. Additionally, continual detection of the eyes, allows the proper region of the mirror or image reflecting surface to be captured by the camera and shared with the third-party participants as a continuous video feed even should the user slightly shift his or her position while in front of the mirror or image reflecting surface.

By way of example, methods to scan for irises include an automated method of biometric identification that uses mathematical pattern-recognition technology on video images, specifically on the irises of a person's eyes, which consist of complex random patterns that are unique which by way of example is disclosed in U.S. Pat. No. 8,489,887, the disclosure of which is incorporated by reference. In addition, as disclosed in U.S. Pat. No. 8,457,363, which is incorporated by reference herein, another technique for eye detection in an image includes accurately detecting eyes by dividing an input face image into left and right images, detecting eye candidates from limited image regions of the left and right images, evaluating the detected eye candidates using geometric information, and verifying the eye candidates using a support vector machine (SVM) algorithm.

Another technique includes retinal scanning, which uses camera technology with subtle infrared illumination to acquire images of the details of the iris. Another technique is disclosed by way of example in U.S. Pat. No. 8,090,157, the disclosure of which is incorporated by reference herein. The '157 patent describes a technique, whereby the eye is illuminated to generate a reflection reference point on the pupil surface. The captured wide-field image is filtered using reflection detection contrast changes to find potential eye locations. For each potential eye location, the local contrast change between the central point and its surrounding pixels is computed and results are prioritized to extract valid eye pair with maximum local contrast change. The eye pair is defined as a valid pair if the two potential eyes are spaced within a predefined range. The following techniques are, by way of example, and the current disclosure is not limited to any particular technique for eye detection processes.

Once the system has detected the eye(s) or the iris portion of the eye(s) of the person whose image is currently projected on the mirror or image reflecting surface in the environment, the system next crops the captured video feed as shown in step (7) through cropping tools, such as Computer Vision, Open Source®. Cropping is used to eliminate unwanted portions of the video image. The eye detection data will generate, in step (6,) via a processing device, an already mapped location of the user's eyes. The system may use this eye detection data to center the user's image through image processing and cropping techniques to generate the final video feed that will be delivered to the remote users or third-party video chat participants. Libraries available in OpenCV can also be used to implement cropping techniques during step (7) of the mirror chat process.

Once the video feed is cropped, the system will next run a check of the image to determine whether the user defines the video space (8) as defined by the boundaries of the currently cropped video feed. The user's image is compared against the currently cropped video feed and, if the user is not centered or essentially defining the video space, the system will generate a signal to continuously crop the image as shown in steps (7) and (8) of FIG. 3 until the user defines the video space.

Figure 4:
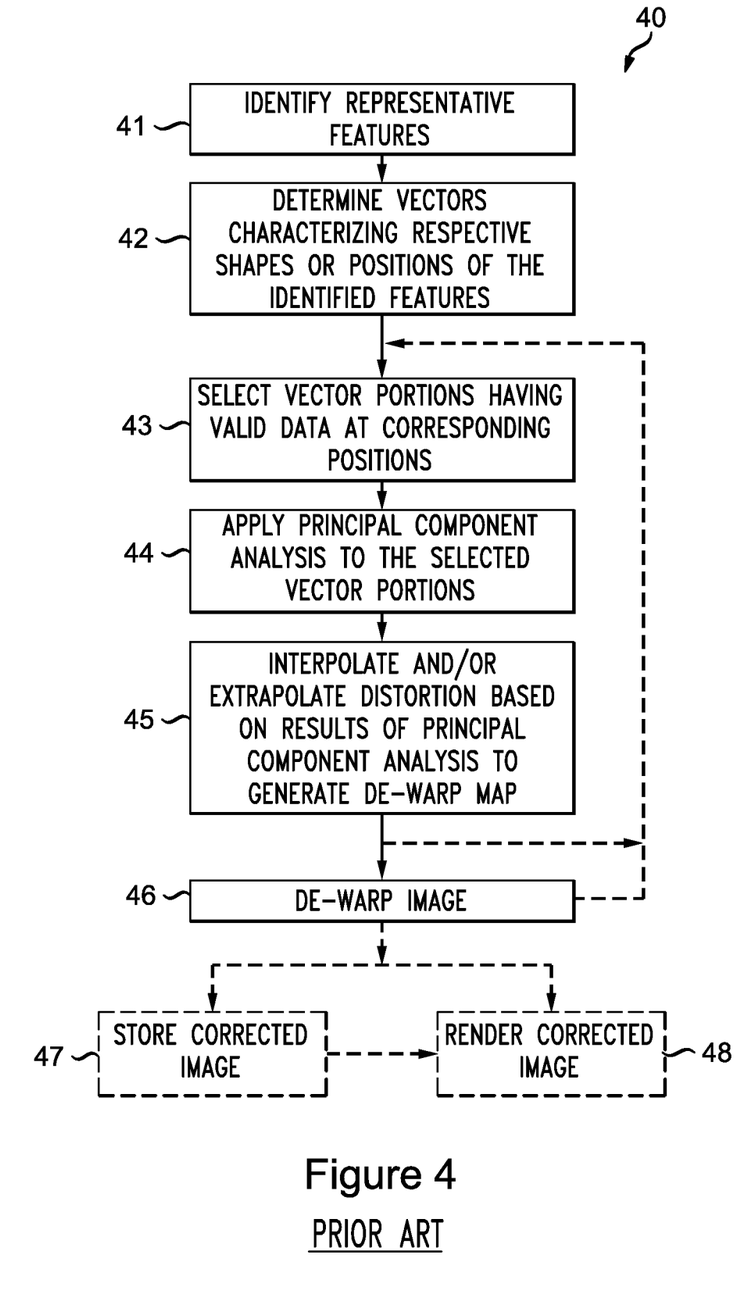
FIG. 4 is a flow chart illustrating a de-warping process as applied to captured video images.

The disclosed system next de-warps (9) the captured images for any distortion by processing the image through de-warping process (40) such as that shown in FIG. 4. In this process as described in U.S. Pat. No. 8,068,695, the user identifies representative features (41) of the object, determines vectors characterizing respective shapes or positions of portions of the identified features (42), selects portions of the determined vectors that have valid data at corresponding positions and applies (44) principal component analysis to the selected vector portions. The output of the principal component analysis includes at least one basis vector and at least one corresponding coefficient with respective sets of at least one coefficient corresponding to each of the selected vector portions. The principal component analysis also generates an average vector describing an average of the selected vectors (45). Together, the average vector, at least one basis vector and sets of coefficients provide an estimate of the curvature or distortion of the object at positions in the image represented by the selected vector portions. The method includes interpolating/extrapolating additional and optionally alternative distortion estimates based on output from the application (44). The output or de-warp map generated by this interpolation/extrapolation (45) can then be used to de-warp (46) at least a portion of the image or a first area associated with the selected vector portions (43). The de-warped image or image portion can then be stored (47) or used to render (48) a corrected or compensated version of the image.

The disclosed system next will proceed to use the captured image to join the user into the video chat session or the image may also be flipped to correct for the image reversal caused by the reflection of the user's image from the mirror or image reflecting surface. The user may now enter into a video-conference with the remote third-party video chat participants. The user can now view live video images of the third-party participants through the eyepiece included in the wearable eye display.

The mirror itself may also now act as a viewable screen onto which the user's viewable images in the wearable display device will be superimposed with the live video feed of the remote third-party participants and simultaneously projected onto the mirror or image reflecting surface during the mirror video chat session. The wearable display user can now view the mirror or image reflecting surface to participate and engage the remote third-party participants in the mirror video chat session while also viewing his or her own image simultaneously.

In certain embodiments, the user may also select portions of the image they want to share with third-party participants. The system may include air motion detection sensors or similar sensor(s) which may detect a user's hand gestures to capture a certain portion of the projected image reflected off the mirror or image reflecting surface. The user may use their thumb and forefinger for example and initiate the gesture with the user's thumb and forefinger touching which is also visible through the camera's eyepiece to the user and currently centered on the portion of the image of interest. The user may then expand open the thumb and forefinger towards the outer boundaries of the portion of their own image that they intend to share with the remote third-party video participants. The system may also be configured to detect other finger, hand waving motions, or other gestures that essentially define and frame the portion of the user's video image that they would like to exchange with the remote third-party participants. The control device of the system processor may be configured to generate a control command to frame a portion of the user's video image in response to a pointing gesture or other gesture associated with the displayed processor content.

The disclosed system may also be configured to provide tactile or haptic type feedback such as generating a vibrate or similar resistance type signal which is delivered to the side of the wearable device or in which the user may have moved out of the focal point of the currently projected image to remote third-party participants. In addition, a haptic type signal may be generated when a user lean's outside the focal point of the currently projected image to remote third-party participants. As an example, as the user approached the right edge of the mirror or image reflecting surface, the user may sense a slight vibration which is emitted from the right side of the wearable device. As the user leans closer to the edge of the mirror or image reflecting surface, actually stepping outside the line of view of the mirror as captured by the camera, the vibration may intensify to signal to the user of the wearable device that he or she has left the entire area of possible image capture for the camera. Essentially this feature would be a signal to the user that translates to the side of the mirror in which the user has stepped very close or closer to the edge of the mirror. The signal would strengthen if the user has completely stepped out of the mirror's line of view and essentially, the scope of the camera's image capturing area. The signal may also serve as a tactile guide to the user to step more towards the center of the mirror or image reflecting surface and more towards the opposite side of the user's wearable device in which the signal is received or within the scope of the camera's image capturing area.

In yet another embodiment, a process is performed for the removal of bright spots which may be reflected from the mirror or image reflecting surface and which may impede viewing of the video image of the user by the remote third-party participants and for the user as well. The device may detect bright spots on the captured image, merge the image and remove these bright spots through de-warping processes. This feature may also be accomplished in some embodiments using libraries in OpenCV that accomplish bright spot removal. The system may implement OpenCV to locate an area in the image that appears brighter than the average brightness of the overall image. A filter is then implemented to reduce the areas having higher levels of brightness which distort the video feed.

In some embodiments, the disclosed system using an image processing device, operates to process image data such as detected bright spot(s) or high-contrast area(s) in the captured video image(s), more specifically to images reflected from a mirror-like surface. An image de-warper de-warps image data according to obtained sets of position estimates and generates a compensated version of the image data with unwanted anomalies such as the detected bright spots or observed high "contrast areas". At least one of an image data storage device is operative to store the compensated version of the image data and a rendering device is operative to render the compensated version of the image data. At least one of the feature identifier, the feature vector determiner, the vector selector, the principal component analyzer, the correction estimator, the bright-spot image de-warper, the image data storage device and the rendering device is implemented in hardware or a combination of hardware and/or software to generate a compensated version of the image data through such de-warping techniques.

Figure 5:
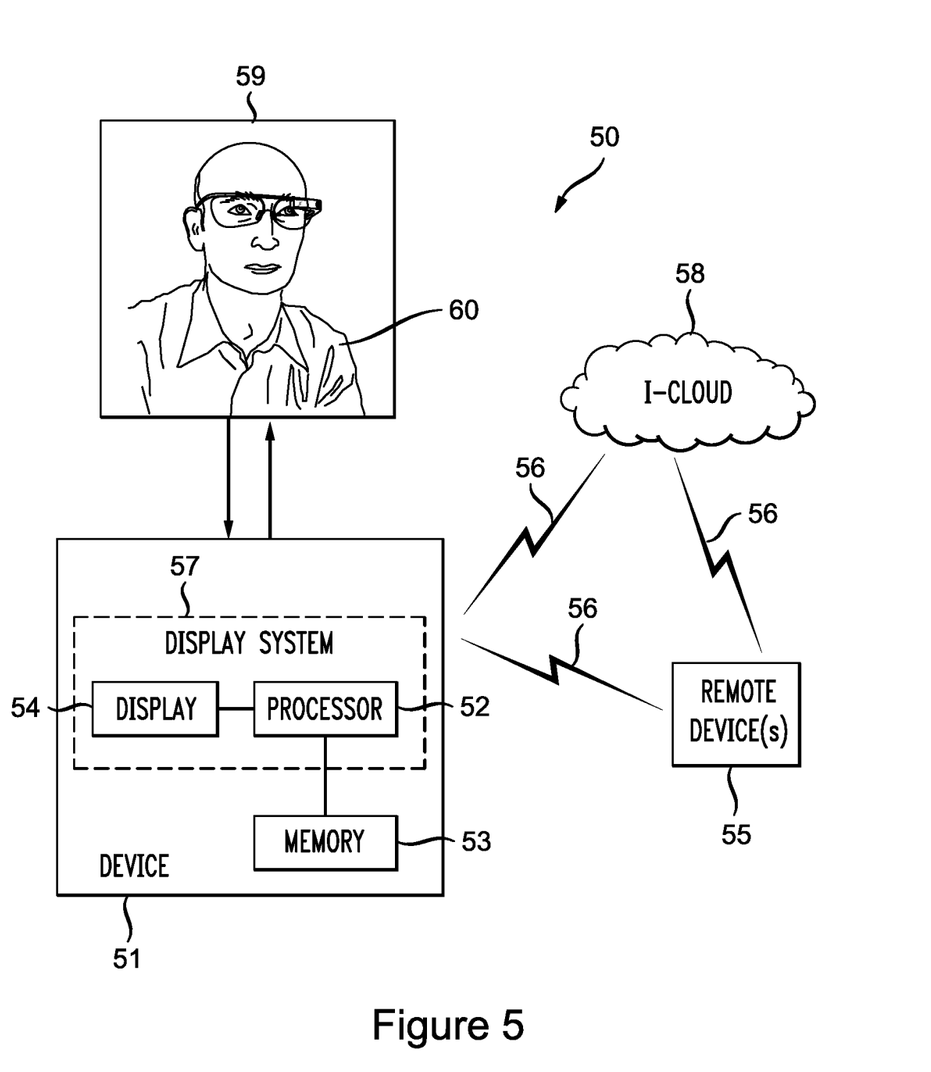
FIG. 5 is a block diagram showing an exemplary embodiment of a computer network infrastructure.

FIG. 5 is an example schematic diagram of a computer network infrastructure implemented in the disclosed mirror chat system. The system (50) includes a device (51) that communicates using a communications link (56) (e.g., wired or wireless) to a remote device (55) and/or to an iCloud network and/or iCloud network driver (58). The device may be any type of device configured to receive data and display information corresponding to the exchange of audio-visual data between users. The device may be a head-mounted wearable display device (20) or similar wearable computing device as shown in FIG. 1. The device (51) may include a display system (57) comprising a processor (52) and a display (54). The processor (52) may receive data from the remote device (55) and configure the data for display on the display (54). The display may also be projected onto a mirror (59) and the user's own image (60) may be visible to the remote participants via the processing and exchange of data between the device (51) and one or more remote device(s) (55). The device (51) may also include on-board data storage, such as a memory (53) coupled to processor (52) such as a microprocessor or a digital signal processor. The memory (53) may store software and other data that can be retrieved and executed by the processor (52), for example. The remote device (55) may be any type of computing device or transmitter including a laptop computer, a mobile telephone or table computing device, etc. that is configured to transmit data to the device (51). The remote device (55)

and the device (51) may contain hardware to enable the one or more communication link(s) (56), via processors, transmitters, receivers, antennas, etc. between the wearable computing device (51), one or more remote device(s) (55) and an iCloud (58).

As shown in FIG. 5, the communication link(s) (56) is preferably a wireless connection. However, wired connections may also be implemented such as a wired serial bus or a parallel or other proprietary connection. The communication link(s) (56) may be implemented wirelessly via a wireless connection such as Bluetooth® radio technology, cellular technologies such as GSM, CDMA, WiMAX, LTE®, communication protocols such as IEEE 802.11 including revisions thereto, Zigbee® technology, among other wireless configurations. The remote device(s) (55) may be accessible via the Internet and may include a computer cluster associated with a particular web service such as Skype®, FaceTime, social networking, photo sharing, and the like.

There are a number of advantages of using mirror chat rather than known and more complex videoconference systems in that it is much less costly to purchase the special equipment required for most videoconference apparatus. Mirror chat requires no special equipment other than a mirror or image reflecting surface in the environment and a wearable display device or similar computing device with forward-facing camera or similar image capturing device.

An additional significant advantage in using mirror chat is that eye gaze correction can be accomplished with greater precision and without any additional significant processing. This is essentially a natural result of using a mirror or image reflecting surface instead of a camera to capture one's own image. It is a known problem, that when one opens their webcam view on their computers or a camera from their smartphone and targets their own image, it appears as if the image does not look exactly as the image being captured. A property of using a camera to capture one's own image is that you are generally unable to make eye contact naturally without some distortion (for example, eye gaze distortion) when actually making eye contact with the computer or the smartphone. However, when using the mirror or image reflecting surface, your image appears exactly as reflected from the mirror or image reflecting surface without processing the user's eye gaze such that a more natural eye gaze is captured rather than the eye gaze distortion typically experienced with computer or smartphone cameras and/or similar kinds of cameras implemented in processing devices.

Figure 6:
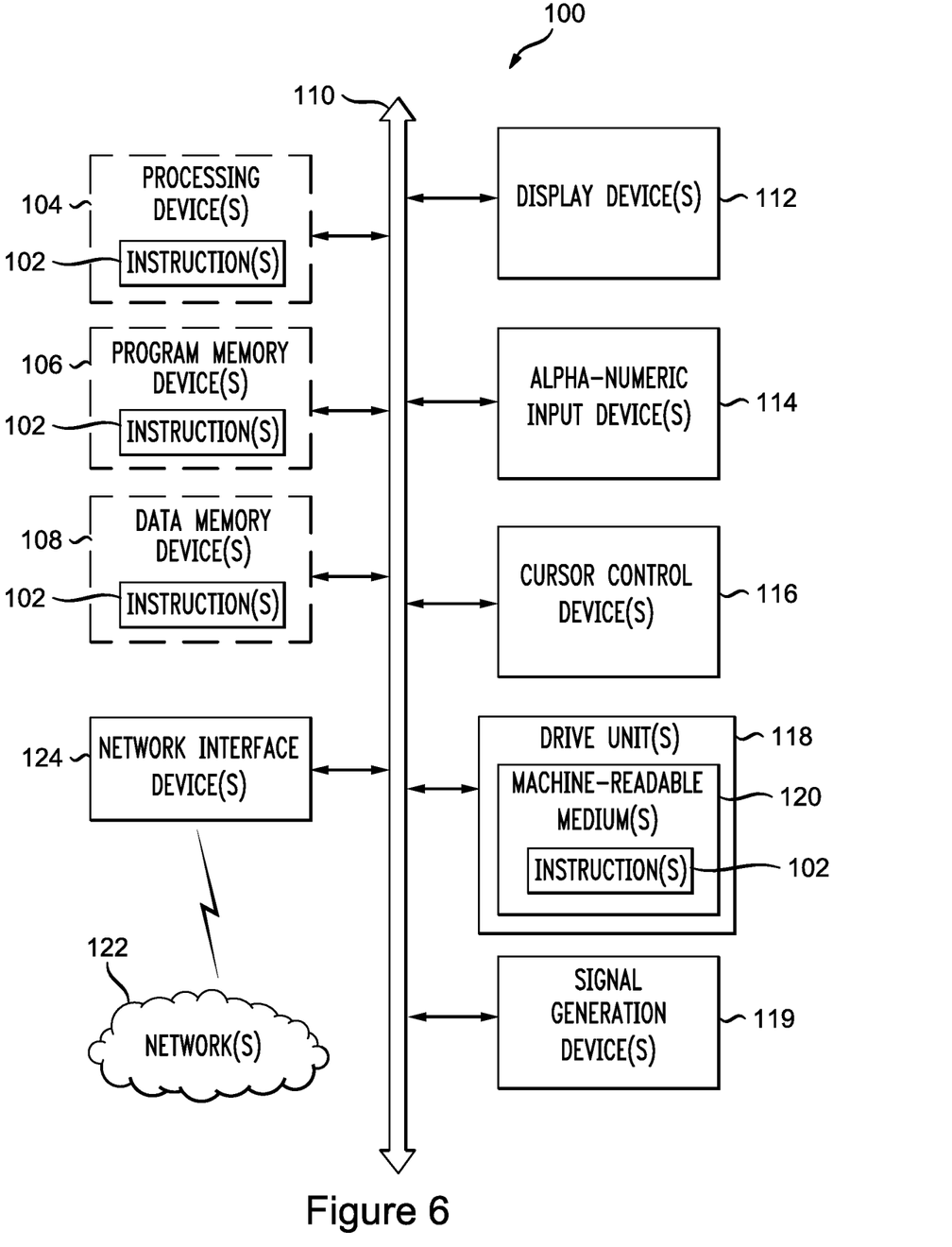
FIG. 6 is a block diagram showing a portion of an exemplary machine in the form of a computing system configured to perform methods according to one or more embodiments.

FIG. 6 is a block diagram of an embodiment of a machine in the form of a computing system 100, within which a set of instructions 102, that when executed, may cause the machine to perform any one or more of the methodologies disclosed herein. In some embodiments, the machine operates as a standalone device. In some embodiments, the machine may be connected (e.g., using a network) to other machines. In a networked implementation, the machine may operate in the capacity of a server or a client user machine in a server-client user network environment. The machine may comprise a server computer, a client user computer, a personal computer (PC), a tablet PC, a personal digital assistant (PDA), a cellular telephone, a mobile device, a palmtop computer, a laptop computer, a desktop computer, a communication device, a personal trusted device, a web appliance, a network router, a switch or bridge, or any machine capable of executing a set of instructions (sequential or otherwise) that specify actions to be taken by that machine.

The computing system 100 may include a processing device(s) 104 (e.g., a central processing unit (CPU), a graphics processing unit (GPU), or both), program memory device(s) 106, and data memory device(s) 108, which communicate with each other via a bus 110. The computing system 100 may further include display device(s) 112 (e.g., liquid crystals display (LCD), a flat panel, a solid state display, or a cathode ray tube (CRT)). The computing system 100 may include input device(s) 146 (e.g., a keyboard), cursor control device(s) 116 (e.g., a mouse), disk drive unit(s) 118, signal generation device(s) 119 (e.g., a speaker or remote control), and network interface device(s) 124.

The disk drive unit(s) 118 may include machine-readable medium(s) 120, on which is stored one or more sets of instructions 102 (e.g., software) embodying any one or more of the methodologies or functions disclosed herein, including those methods illustrated herein. The instructions 81 may also reside, completely or at least partially, within the program memory device(s) 106, the data memory device(s) 108, and/or within the processing device(s) 104 during execution thereof by the computing system 100. The program memory device(s) 106 and the processing device(s) 104 may also constitute machine-readable media. Dedicated hardware implementations, not limited to application specific integrated circuits, programmable logic arrays, and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present embodiment contemplates a machine-readable medium or computer-readable medium containing instructions 102, or that which receives and executes instructions 102 from a propagated signal so that a device connected to a network environment 122 can send or receive voice, video or data, and to communicate over the network 122 using the instructions 102. The instructions 102 may further be transmitted or received over a network 122 via the network interface device(s) 124. The machine-readable medium may also contain a data structure for storing data useful in providing a functional relationship between the data and a machine or computer in an illustrative embodiment of the disclosed systems and methods.

While the machine-readable medium 120 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the present embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

Although the present specification describes components and functions implemented in the embodiments with reference to particular standards and protocols, the disclosed embodiment are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 31 C.F.R. §1.12(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods, functions or logic described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods, functions or logic described herein.

It should also be noted that software which implements the disclosed methods, functions or logic may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

Although preferred embodiments have been described herein with reference to the accompanying drawings, it is to be understood that the disclosure is not limited to those precise embodiments and that various other changes and modifications may be affected herein by one skilled in the art without departing from the scope or spirit of the embodiments, and that it is intended to claim all such changes and modifications that fall within the scope of this disclosure.

What is claimed is:

1. A method of exchanging audio-visual communication information between users, the method comprising:
    detecting, using an image capturing device associated with a wearable communication device, an image reflecting surface disposed in an environment of a first user, the image capturing device being forward-facing relative to the first user and embedded in the wearable communication device;
    detecting, using a processing device, a first boundary of the image reflecting surface in response to the image reflecting surface being detected in the environment of the first user by the image capturing device;
    providing a tactile signal of variable strength to a first side of the wearable communication device in response to a sensory detection signal associated with a direction of movement of an image of the first user reflected from the image reflecting surface, the image being shifted outside the first boundary of the image reflecting surface, the tactile signal guiding the direction of movement of the first user towards the first boundary of the image reflecting surface, the first boundary corresponding with the first side of the wearable communication device;
    selecting an area of the image reflecting surface which defines an area associated with at least a portion of a first image within the first boundary of the image reflecting surface;
    selecting, using the processing device, the portion of the first image displayed on the image reflecting surface within the first boundary of the image reflecting surface, the portion of the first image being associated with the area of the image reflecting surface; and
    displaying, using a display device embedded in the wearable communication device, the portion of the first image as an overlay on a second image to a second user, the portion of the first image overlaying the second image, thereby being viewable by the first user.

2. The method, as defined by claim 1, further comprising controlling selection of the portion of the first image in response to an image defining gesture associated with the first user.

3. The method, as defined by claim 2, further comprising modifying a size of the portion of the first image in response to the image defining gesture associated with the first user.

4. The method, as defined by claim 3, further comprising displaying the portion of the first image as an overlay on the second image on the image reflecting surface disposed in the environment of the first user to be viewed by the first user.

5. The method, as defined by claim 1, further comprising rotating the image capturing device in response to the first user.

6. The method, as defined by claim 1, further comprising rotating the image capturing device in response to a sensory image signal detected by the image capturing device.

7. The method, as defined by claim 1, further comprising providing a tactile signal, the tactile signal causing the wearable communication device to vibrate in response to the first user moving out of a focal point of a projected image.

8. The method, as defined by claim 7, further comprising generating a tactile signal to the wearable communication device associated with the first user in response to a sensory detection signal associated with movement by the first user towards an edge of the image reflecting surface.

9. The method, as defined by claim 1, further comprising generating a tactile signal to the wearable communication device associated with the first user in response to a sensory detection signal associated with the direction of movement by the first user outside a second boundary of the image reflecting surface.

10. A system to exchange audio-visual communication information between a first user of a wearable communication device and a second user, the system comprising:
    an image capturing device embedded in the wearable communication device, the image capturing device being forward-facing relative to the first user;
    a processing device;
    a memory device storing instructions that, when executed by the processing device, perform operations comprising:
        detecting an image reflecting surface disposed in an environment of a first user;
        detecting a first boundary of the image reflecting surface in response to the image reflecting surface being detected in the environment of the first user;
        providing a tactile signal of variable strength to a first side of the wearable communication device in response to a sensory detection signal associated with a direction of movement of an image of the first user reflected from the image reflecting surface, the image of the first user being shifted outside the first boundary of the image reflecting surface, the tactile signal guiding the direction of movement of the first user towards the first boundary of the image reflecting surface, the first boundary corresponding with the first side of the wearable communication device;
        selecting an area of the image reflecting surface which defines an area associated with at least a portion of a first image within the first boundary of the image reflecting surface; and
        selecting the portion of the first image displayed on the image reflecting surface within the first boundary of the image reflecting surface, the portion of the first image being associated with the area of the image reflecting surface; and a display device embedded in the wearable communication device, the display device displaying the portion of the first image as an overlay on a second image to a second user, the portion of the first image overlaying the second image, thereby being viewable by the first user.

11. The system, as defined by claim 10, wherein the operations further comprise controlling selection of the portion of the first image in response to an image defining gesture associated with the first user.

12. The system, as defined by claim 11, wherein the operations further comprise modifying a size of the portion of the first image in response to the image defining gesture associated with the first user.

13. The system, as defined by claim 12, further comprising a display device that displays the portion of the first image as an overlay on the second image on an image reflecting surface disposed in the environment of the first user to be viewed by the first user.

14. The system, as defined by claim 10, wherein the operations further comprise rotating the image capturing device in response to the first user.

15. The system, as defined by claim 10, wherein the operations further comprise rotating the image capturing device in response to a sensory image signal detected by the image capturing device.

16. The system, as defined by claim 10, wherein the operations further comprise providing a tactile signal, the tactile signal causing the wearable communication device to vibrate in response to the first user moving out of a focal point of a projected image.

17. The system, as defined by claim 16, wherein the operations further comprise generating a tactile signal to the wearable communication device associated with the first user in response to a sensory detection signal associated with movement by the first user towards an edge of the image reflecting surface.

18. The system, as defined by claim 10, wherein the operations further comprise generating a tactile signal to the wearable communication device associated with the first user in response to a sensory detection signal associated with the direction of movement by the first user outside a second boundary of the image reflecting surface.

19. A computer-readable device storing instructions that, when executed by a processing device, perform operations comprising:

detecting an image reflecting surface disposed in an environment of a first user using an image capturing device, the image capturing device being forward-facing relative to the first user and embedded in a wearable communication device;

detecting a first boundary of the image reflecting surface in response to the image reflecting surface being detected in the environment of the first user;

providing a tactile signal of variable strength to a first side of the wearable communication device in response to a sensory detection signal associated with a direction of movement of an image of the first user reflected from the image reflecting surface, the image of the first user being shifted outside the first boundary of the image reflecting surface, the tactile signal guiding the direction of movement of the first user towards the first boundary of the image reflecting surface, the first boundary corresponding with the first side of the wearable communication device;

selecting an area of the image reflecting surface which defines an area associated with at least a portion of a first image within the first boundary of the image reflecting surface;

selecting the portion of the first image displayed on the image reflecting surface within the first boundary of the image reflecting surface, the portion of the first image being associated with the area of the image reflecting surface; and displaying the portion of the first image as an overlay on a second image to a second user, the portion of the first image overlaying the second image, thereby being viewable by the first user.

20. The computer-readable device of claim 19, wherein the operations further comprise:

controlling selection of the portion of the first image in response to an image defining gesture associated with the first user;

modifying a size of the portion of the first image in response to the image defining gesture associated with the first user; and displaying the portion of the first image as an overlay on the second image on the image reflecting surface disposed in the environment of the first user.

* * * * *